UNITED STATES PATENT OFFICE.

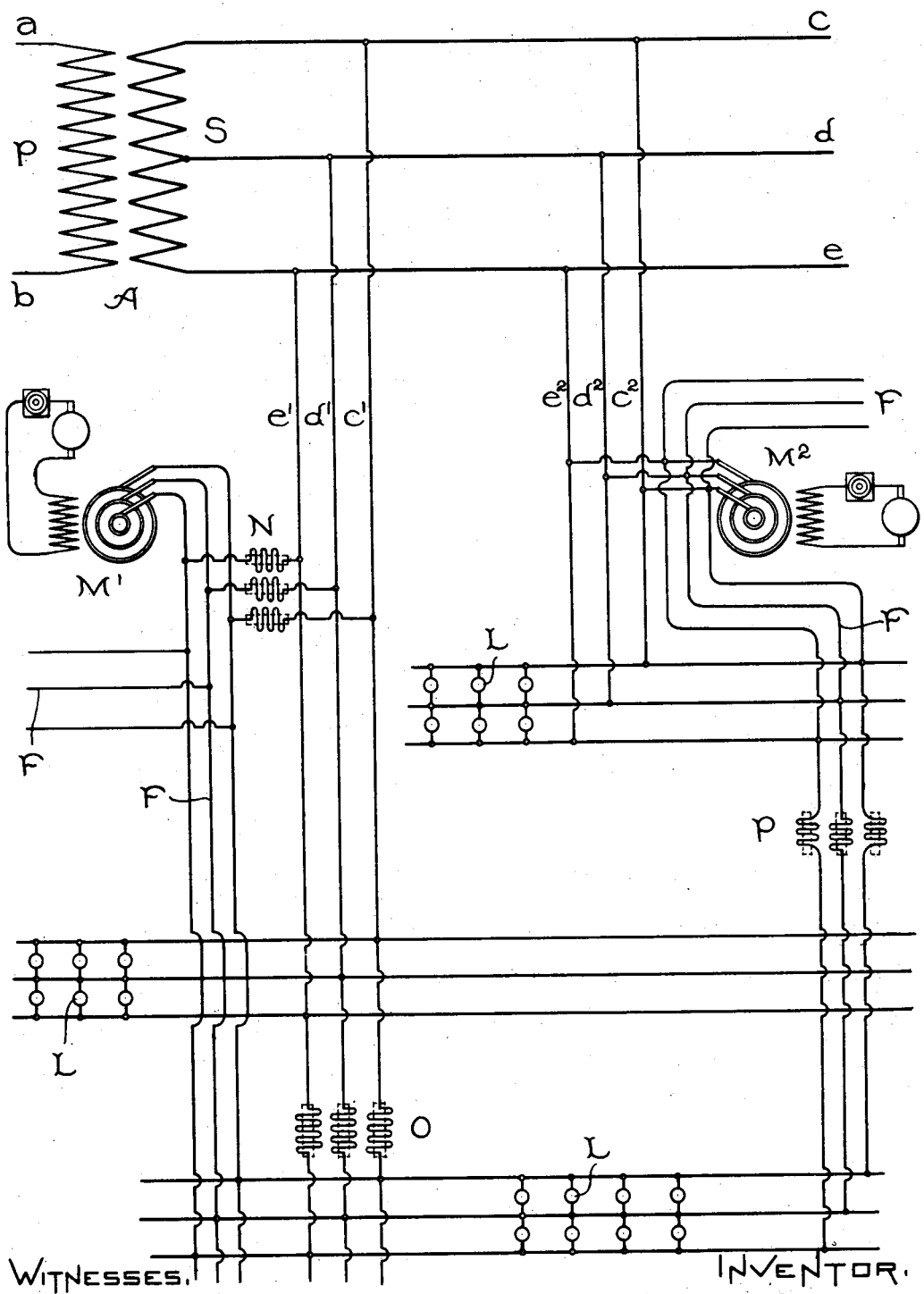

CHARLES P. STEINMETZ, OF SCHENECTADY, NEW YORK, ASSIGNOR TO THE GENERAL ELECTRIC COMPANY, A CORPORATION OF NEW YORK.

SYSTEM OF ELECTRICAL DISTRIBUTION.

SPECIFICATION forming part of Letters Patent No. 713,356, dated November 11, 1902.

Application filed March 6, 1899. Serial No. 707,878. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 727,) of which the following is a specification.

My invention relates to alternating-current systems of electrical distribution, and is more particularly of use in those systems in which the work-circuits are operated at comparatively low potentials, although it is not in any sense limited in its application by the potentials employed.

In order to compensate for the resistance drop of potential in direct-current networks, it is customary to use an extensive system of feeders extending back to and conveying current from the power-station. In low-potential alternating-current systems it is obvious that the same system of feeders and mains as in a direct-current system might be employed, if desired. The expense and inconvenience of extending feeders from the power-station to distant points in the network is, however, one of the serious disadvantages met with in the employment of low-tension currents for distribution over extended areas.

It is one of the objects of my invention to do away with the necessity for the use of extensive and cumbersome feeder-circuits in low-tension alternating systems of electrical distribution.

In accomplishing the object stated I make use of the fact that the potential in an inductive circuit may be made to rise if a source of leading current or electromotive force be connected thereto. By suitable proportioning and adjustment this rise of potential may be made to compensate exactly for the drop of potential, due to ohmic resistance or other causes. A constant potential may thus be maintained.

In carrying out the invention in practice any suitable source of leading current may be employed, though for the present purpose I find it convenient to use synchronous motors with overexcited fields. These are preferably located in proximity to those points in the network which require to be raised in potential to compensate for the drop in the mains. These sources of leading currents or phase-modifiers are connected by what I may term "suction-feeders" with points in the network in the immediate vicinity and act to draw up the potential at those points to the value desired. By the means described constant-potential regulation may be secured without the necessity of extending feeders back to the source of supply.

The nature of my invention will be more apparent from the following description, taken in connection with the drawings, and its scope will be particularly pointed out in the appended claims.

The system to be described is fed from any suitable source of alternating currents. In the drawings a step-down transformer A is shown as serving this purpose, though it is obvious that a generator, rotary converter, or other suitable source might equally as well be employed so far as effecting the object of my invention is concerned. The transformer A has the primary winding P fed from the mains $a\ b$, while the secondary S is tapped at a point intermediate its ends and connected to a main $d$. The outer terminals of the secondary are connected to mains $c\ e$, thus forming, in conjunction with the main $d$, a three-wire system which is intended to supply a network of conductors of considerable extent. In the drawings I have shown for convenience only a portion of the network. The mains $e'\ d'\ c'$ and $e^2\ d^2\ c^2$ are connected to the corresponding wires of the three-wire system and convey current to lamps L or other translating devices connected to the network in the ordinary manner. Overexcited synchronous motors are connected to the network at suitable points and are located at substations more or less remote from the source of current-supply. For purposes of illustration I have shown two synchronous motors $M'\ M^2$, connected to the mains $e'\ d'\ c'$ and $e^2\ d^2\ c^2$, respectively. Leading from the terminals of the motors are feeders F, which connect with points in the network in proximity thereto.

The employment of the means shown obviates the necessity for carrying feeders back to the main station. In accordance with the present invention feeders are led from points in the network back only to the nearest substation containing only a synchronous motor with overexcited fields, as has been explained.

The self-induction of the mains, acting in conjunction with the leading electromotive force derived from the overexcited synchronous motors, will frequently be sufficient to cause the desired rise of potential to compensate for drop. If the self-induction of the mains is insufficient for this purpose, it is necessary to introduce an artificial self-induction, and this may be done by coiling the mains or the feeders from distance to distance, as illustrated, for example, at N, O, and P in the drawings, or, if desired, inductance-coils with iron cores may be employed, as indicated at N, O, and P in dotted lines.

If the synchronous motors M' and M² be built with very low self-induction, they will, even without regulation, exert a powerful equalizing influence tending toward the maintenance of a constant potential. If closer regulation for constant potential is desired, the motors may be regulated by means responsive to changes of potential of the mains, as set forth, for example, in Patent No. 594,144, granted to me November 23, 1897. Inasmuch as the specific means for regulating the motors forms no essential part of the present invention, it is considered unnecessary to illustrate or further describe the same.

Although the invention has been shown as applied to a three-wire system, it will of course be understood that it is in no way limited thereto, for it is equally applicable to any system employing alternating or variable currents of electricity whether the same be single phase or multiphase.

Instead of synchronous motors of the ordinary type, in which a separately-excited field is used, I may, if desired, use self-exciting machines, such as rotary converters, since either type of machine is applicable for the purposes of my invention. The direct current produced by the rotary converters may be employed solely for purposes of field excitation or may in addition be distributed to translating devices, as may be found desirable.

Having thus described my invention, what I claim as new, and desire to secure by Letters Patent of the United States, is—

1. The combination of a phase-advancing device connected to an inductive supply-circuit and feeders leading from said phase-advancing device.

2. The combination of mains, a phase-advancing device connected to said mains, and feeders leading from said phase-advancing device.

3. The combination of a work-circuit, a phase-advancing device connected to a supply-circuit, and feeders leading from said phase-advancing device and connected to said work-circuit.

4. The combination of a work-circuit, an artificial inductance in said work-circuit, means for supplying current through said inductance to a phase-advancing device, and feeders leading from said phase-advancing device to points in said work-circuit.

5. The combination with a three-wire system of distribution, of a phase-advancing device in connection therewith and feeders leading from said phase-advancing device.

6. The combination of a source of alternating currents, an interconnected system of distributing-conductors connected thereto, phase-advancing devices located at substations and connected to points in the system, and "suction-feeders" leading from said phase-advancing devices and connected to other points in the system.

7. The combination of an alternating-current system, a phase-shifting device, means for taking current from some selected point in said system and passing it through said phase-shifting device, and means for impressing the electromotive force at the terminals of said device upon another point of said system.

In witness whereof I have hereunto set my hand this 3d day of March, 1899.

CHARLES P. STEINMETZ.

Witnesses:
BENJAMIN B. HULL,
MABEL E. JACOBSON.